(12) United States Patent
Wollin et al.

(10) Patent No.: US 11,745,923 B2
(45) Date of Patent: Sep. 5, 2023

(54) CABLE OR UTILITY TIE

(71) Applicant: Klein Tools, Inc., Lincolnshire, IL (US)

(72) Inventors: Daniel Wollin, Northbrook, IL (US); John Gibbons, Palatine, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 0 days.

(21) Appl. No.: 17/520,017

(22) Filed: Nov. 5, 2021

(65) Prior Publication Data
US 2022/0144511 A1 May 12, 2022

Related U.S. Application Data

(60) Provisional application No. 63/112,297, filed on Nov. 11, 2020.

(51) Int. Cl.
*B65D 63/10* (2006.01)

(52) U.S. Cl.
CPC .................. *B65D 63/1018* (2013.01)

(58) Field of Classification Search
CPC ... F16L 3/233; Y10T 24/1498; B65D 63/1018
See application file for complete search history.

(56) References Cited

U.S. PATENT DOCUMENTS

| | | | |
|---|---|---|---|
| 1,086,442 A * | 2/1914 | Cornelius | F16L 3/14 248/909 |
| 3,224,054 A * | 12/1965 | Lige | F16L 3/233 248/74.3 |
| 4,466,159 A * | 8/1984 | Burrage | B65D 77/18 24/17 AP |
| 10,472,147 B2 * | 11/2019 | Beckman | B65D 63/1018 |

* cited by examiner

*Primary Examiner* — Robert Sandy (57) ABSTRACT

A cable tie includes a strip of material having a pair of longitudinally extending sides spaced from each other by a width W. In one form the strip includes a plurality of additional openings that are configured to receive the shank of a fastener. In one form, a plurality of first and second size openings are formed in the strip and spaced from each other along the longitudinal axis. Each of the first size openings have a first length LF parallel to the longitudinal axis and are located in a corresponding one of a first set of wide portions. Each of the second size openings are spaced from each other along the longitudinal axis so that one or more of the second size openings are located between pairs of the first size openings, with each of the second size openings located in a corresponding one of a second set of wide portions and having a length LS parallel to the longitudinal axis that is less than LF In one form, the strip includes a first plurality of notch pairs spaced from each other by a first distance D1, a second plurality of the notch pairs is spaced from each other by a second distance D2 that is less than the distance D1, and a plurality of elongate openings, with each opening located in the strip between two adjacent notch pairs that are spaced by the first distance D1.

23 Claims, 7 Drawing Sheets

CABLE OR UTILITY TIE

CROSS-REFERENCE TO RELATED APPLICATIONS

This application claims priority to U.S. Patent No. 63/112,297 filed Nov. 11, 2020, the entire disclosure of which is incorporated herein by reference.

BACKGROUND OF THE DISCLOSURE

The present disclosure relates ties commonly referred to as cable or utility ties that can be used to tie one or more cables or other objects.

Figure 1:
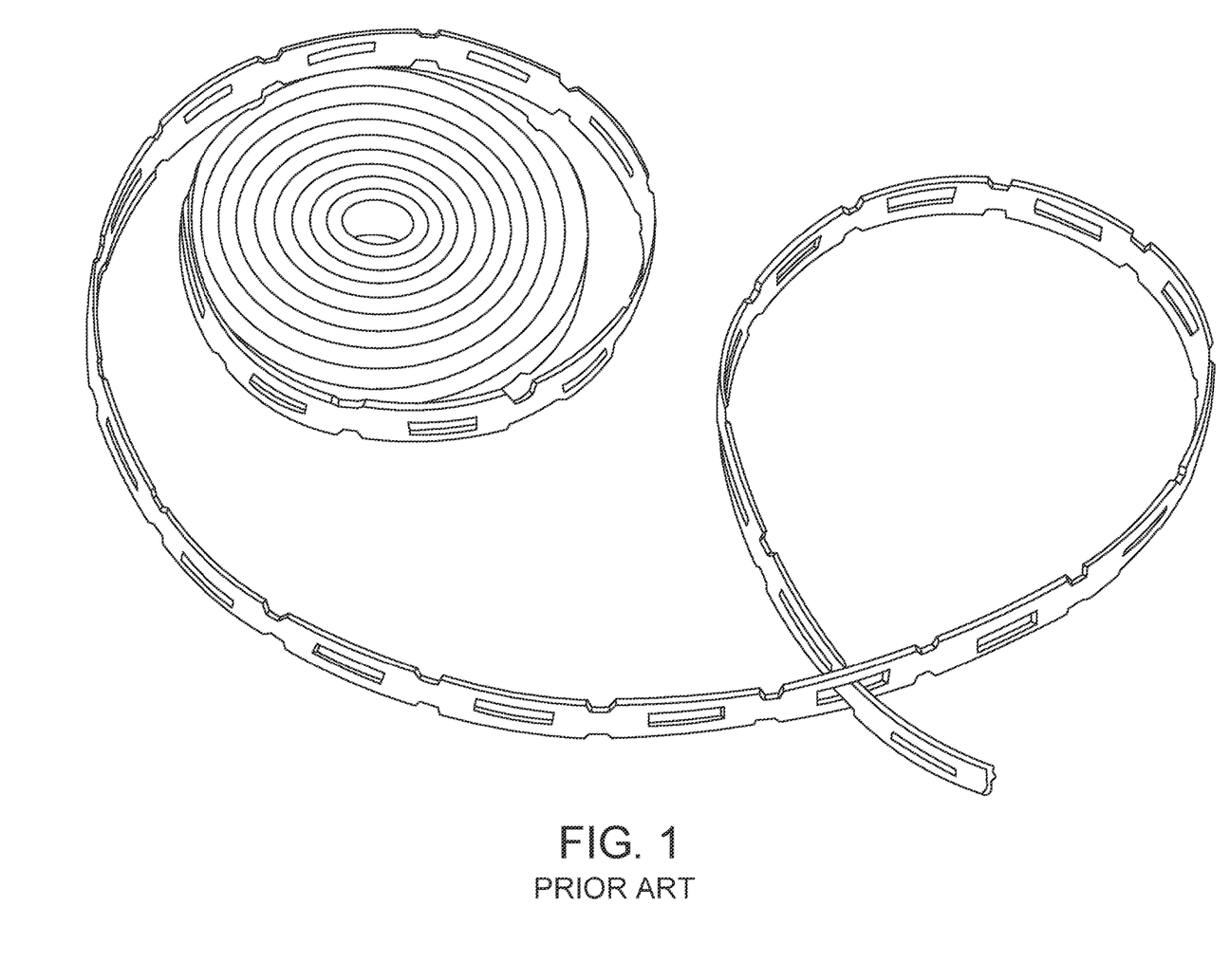
FIG. 1 is a perspective view of a prior art cable tie.

One commercially available type of cable or utility tie is shown in FIG. 1 and includes a strip of material having a plurality of alternating wide and narrow portions that allow the tie to form a retaining loop that encircles one or more cables or other objects. In this regard, the strip of material includes elongate openings or slots formed in the wide portions that allow another wide portion to be inserted through one of the slots until a narrow portion is captured in the slot to form the retaining loop that encircles one or more cables or other objects. One such cable/utility tie is sold by DIMEX LLC under the tradename EasyFlex® Locking Tree Ties. While such cable/utility ties work well for their intended purpose, there is always room for improvement.

BRIEF SUMMARY OF THE DISCLOSURE

In accordance with one feature of this disclosure, a cable tie is provided for attaching one or more cables to a structural member. The cable tie includes a strip of material extending along a longitudinal axis. The strip includes a plurality of alternating wide portions and narrow portions, with each of the wide portions having a width $W_W$ transverse to the longitudinal axis and each of the narrow portions having a width $W_N$ transverse to the longitudinal axis. $W_N$ is less than $W_W$. Each of the narrow portions has a length $L_N$ parallel to the longitudinal axis. A first set of the wide portions has a length $L_1$ parallel to the longitudinal axis. A second set of the wide portions has a length $L_2$ parallel to the longitudinal axis, with the length $L_1$ being greater than the length $L_2$, and the length $L_2$ being greater than the length $L_N$. The strip further includes a plurality of first size openings formed in the strip and spaced from each other along the longitudinal axis. Each of the first size openings has a first length $L_F$ parallel to the longitudinal axis. Each of the first size openings is located in a corresponding one of the first set of wide portions. The strip also includes a plurality of second size openings formed in the strip and spaced from each other along the longitudinal axis so that one or more of the second size openings are located between pairs of the first size openings. Each of the second size openings is located in a corresponding one of the second set of wide portions. Each of the second size openings has a length $L_S$ parallel to the longitudinal axis that is less than $L_F$.

In one feature, a single one of the second size openings is located between each pair of first size openings.

According to one feature, there are two of the second size openings located between each pair of first size openings.

As one feature, there are three of the second size openings located between each pair of first size openings.

In one feature, each of the first size opening have a width $W_F$ transverse to the longitudinal axis that is approximately equal to the width $W_N$ of the narrow portions.

As one feature, every wide portion of the first set includes one of the first size openings, and every wide portion of the second set includes one of the second size openings.

According to one feature, $L_F$ is equal to or greater than $W_W$.

As one feature, the strip has a thickness T transverse to the longitudinal axis, and each of the first size opening have a width $W_F$ transverse to the thickness and the longitudinal axis, with $W_F$ being greater than the thickness T.

In one feature, each of the first openings is centered in the corresponding one of the first set of wide portions.

According to one feature, each of the second openings is centered in the corresponding one of the second set of wide portions.

As one feature, each of the first openings has a rectangular shape.

In one feature, each of the second openings have an oval shape.

According to one feature, at least some of the second openings have a circular shape.

In one feature, the ratio $L_1/L_2$ equals 2.33

As one feature, the ratio $(L_1+L_N)/(L_2+L_1)$ equals 2.

As one feature, each of the narrow portions is centered on the longitudinal axis.

In one feature, each of the narrow portions is defined by a pair of notches formed in the strip of material.

According to one feature, the strip of material has a thickness transverse to the longitudinal axis that is less than ⅕ of $W_W$.

In accordance with one feature of this disclosure, a cable tie for attaching one or more cables to a structural member and includes a strip of material having a pair of longitudinally extending sides spaced from each other by a width W. The strip includes a plurality of notch pairs spaced from each other along the strip, with each notch of each pair extending from one of the spaced sides toward the other notch of the pair. A first plurality of the notch pairs is spaced from each other by a first distance $D_1$, and a second plurality of the notch pairs is spaced from each other by a second distance $D_2$ that is less than the distance $D_1$. The strip of material further includes a plurality of elongate openings, with each opening located in the strip between two adjacent notch pairs that are spaced by the first distance $D_1$.

As one feature, the ratio of $D_1/D_2$ is equal to 2.

According to one feature, the notch pairs of the second plurality are arranged in groups along the strip, with each group having at least two of the notch pairs located adjacent each other.

In one feature, each of the elongate openings is rectangular shaped.

According to one feature, the strip further includes a plurality of additional openings, with each of the additional openings located in the strip between two adjacent notch pairs that are spaced by the second distance $D_2$. In a further feature, each of the additional openings are oval shaped.

As one feature, the strip of material is a strip of elastomeric material.

It should be understood that the inventive concepts disclosed herein do not require each of the features discussed above, may include any combination of the features discussed, and may include features not specifically discussed above.

DETAILED DESCRIPTION OF PREFERRED EMBODIMENTS

Figure 2:
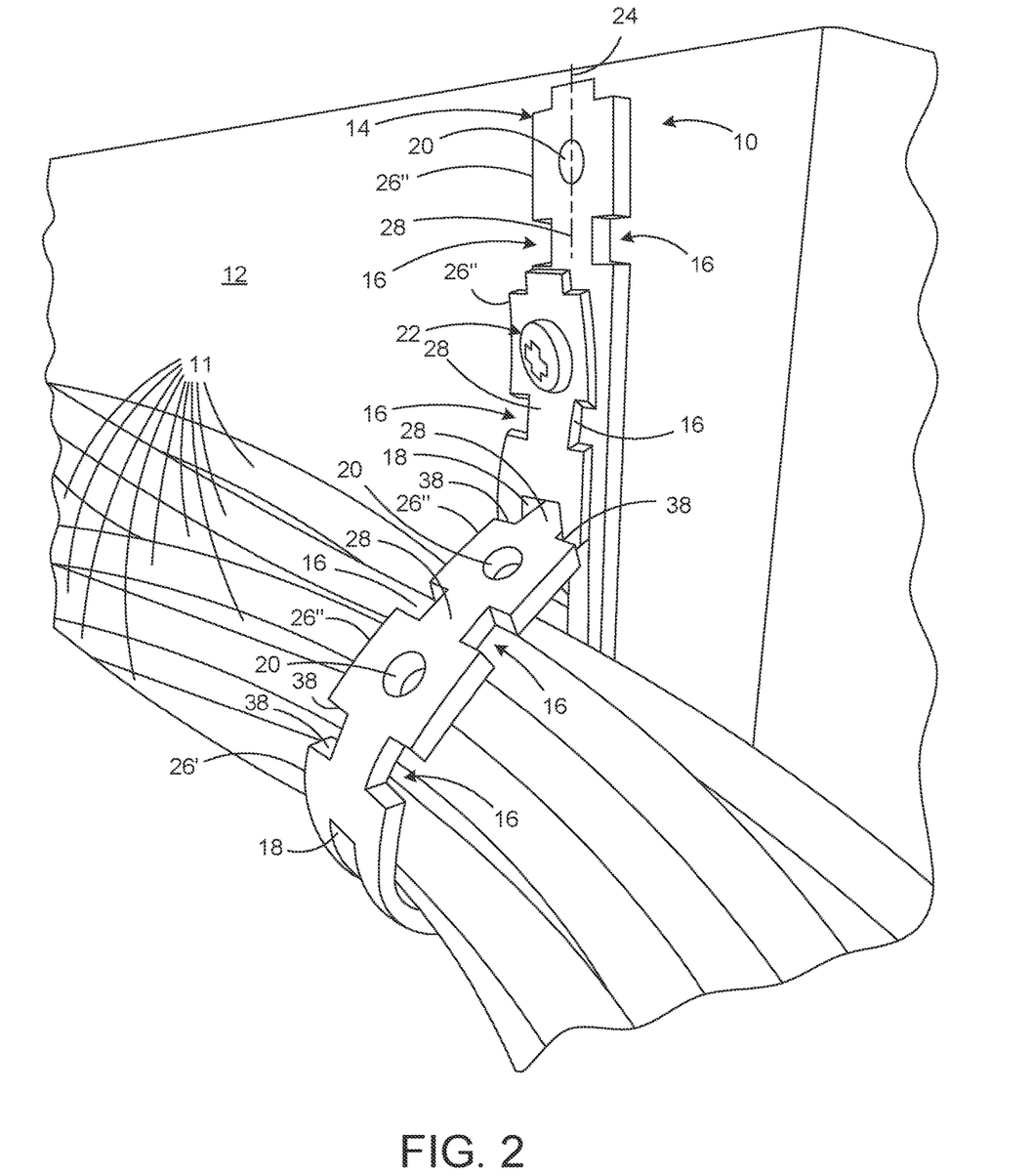
FIGS. 2-4 are perspective views of cable ties according to this disclosure tying a bundle of cables and attaching the cables to a support structure.
Figure 3:
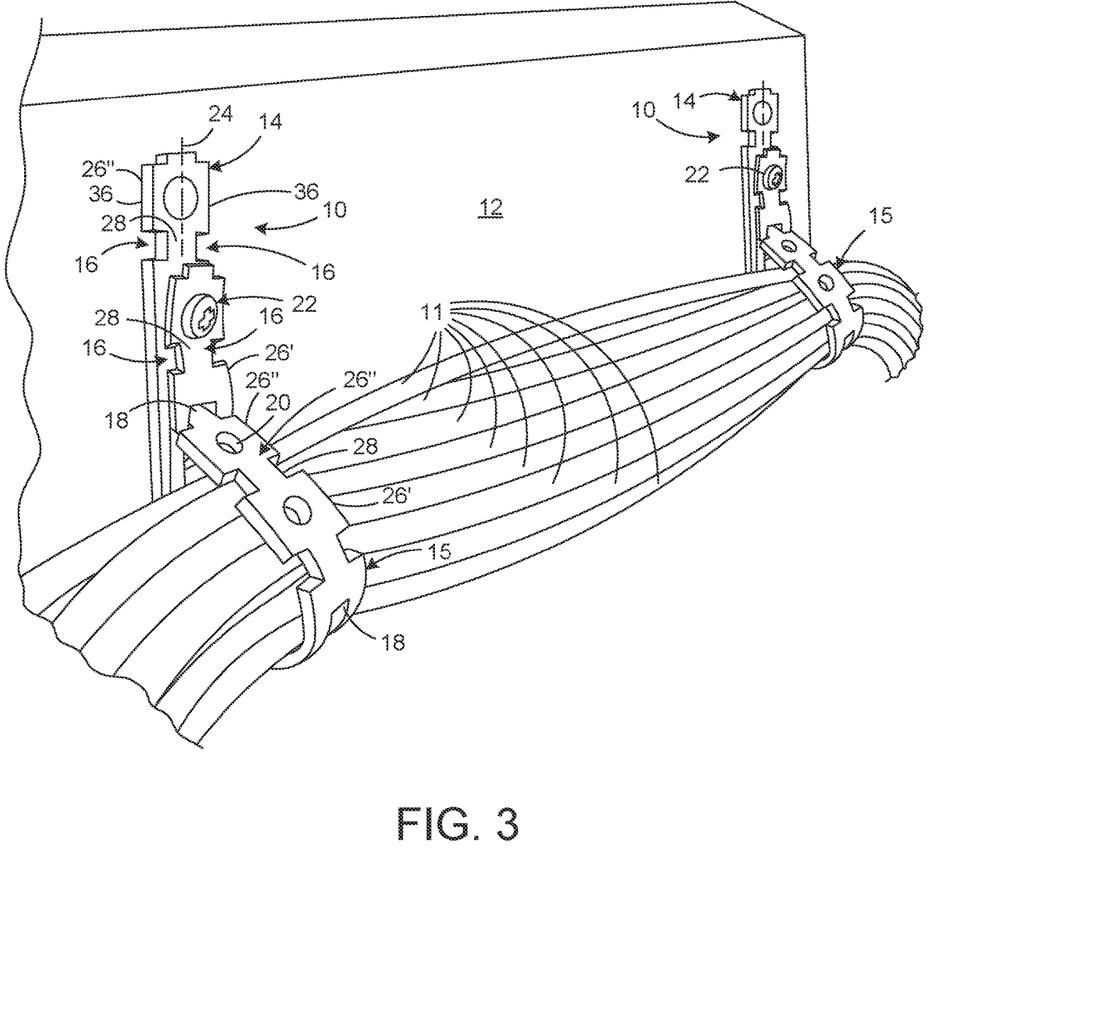
Figure 4:
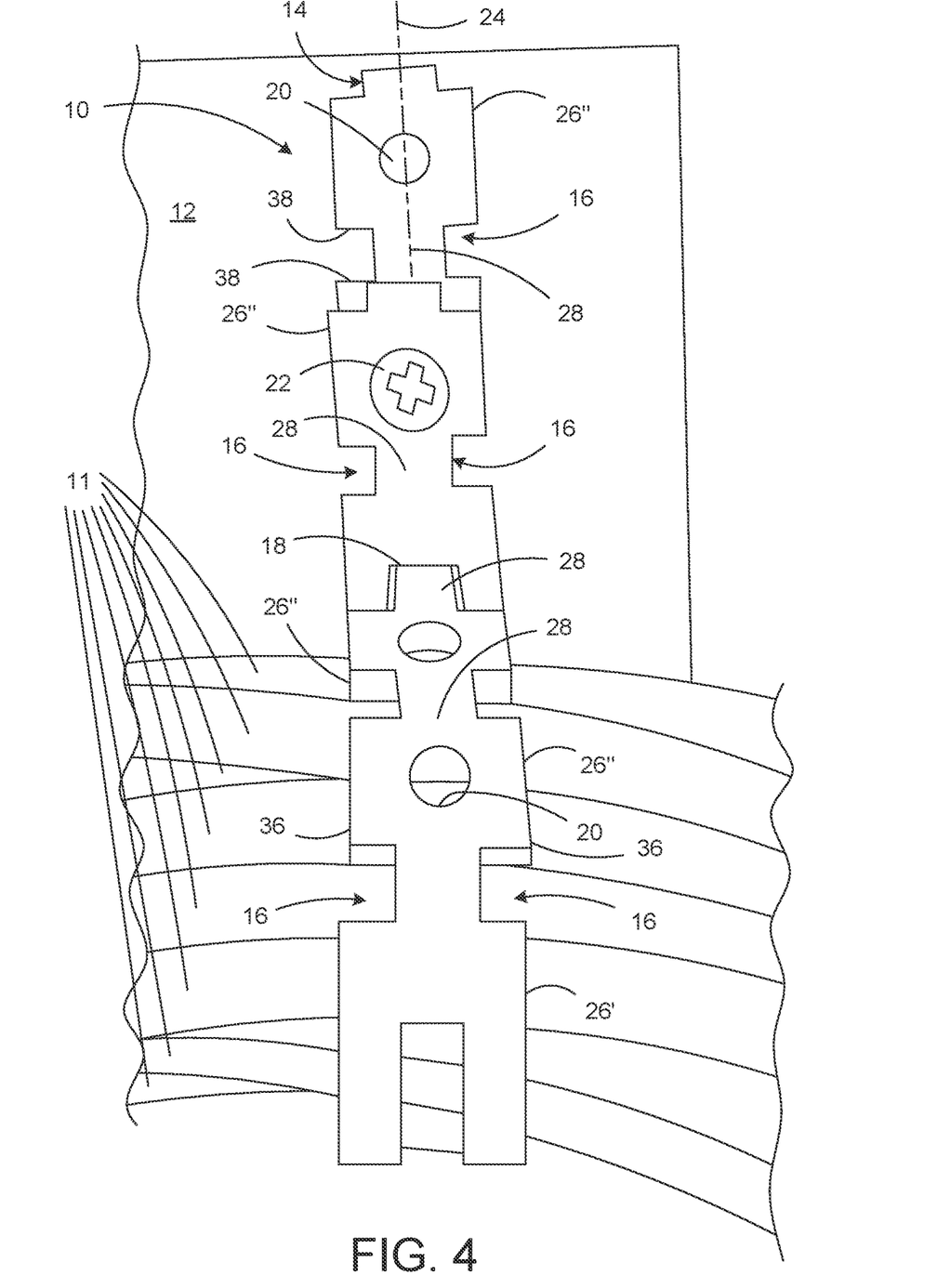

As best seen in FIGS. 2-4, a cable tie 10 is provided for tying one or more objects 11 (illustrated as cables 11 in FIGS. 2-4), and for attaching the one or more objects 11 to a support structure 12. The cable tie 10 includes a strip 14 of material that is configured to provide improved adjustment in the size of a retaining loop 15 by including closely spaced sets of notches 16 that can be secured in elongate openings or slots 18 that are spaced along the strip. Furthermore, in the illustrated and preferred embodiment, the strip 14 of material is configured to provide improved attachment to a support structure by including a plurality of additional openings 20 that are configured to receive the shank of a fastener 22. In the illustrated and preferred embodiments, the strip 14 is formed of a suitable elastomeric material, many of which are known, to allow the retaining loop 15 to be tensioned around one or more objects 11 if desired. It should be understood that in some embodiments it may be desirable for the strap to be made from another suitable material that has sufficient flexibility, resilience and strength, such as a suitable polymeric or metallic material, but that does not have the elastic properties of elastomeric materials. In the illustrated embodiment the fastener 22 is a threaded fastener 22, but it should be understood that the openings 20 are configured to receive shanks of other types of fasteners, such as for example, the shanks of nails, rivets, or staples. Similarly, the support structure 16 in FIGS. 2-4 is a wooden frame member, but the cable tie 10 can be attached to any support structure.

Figure 5:
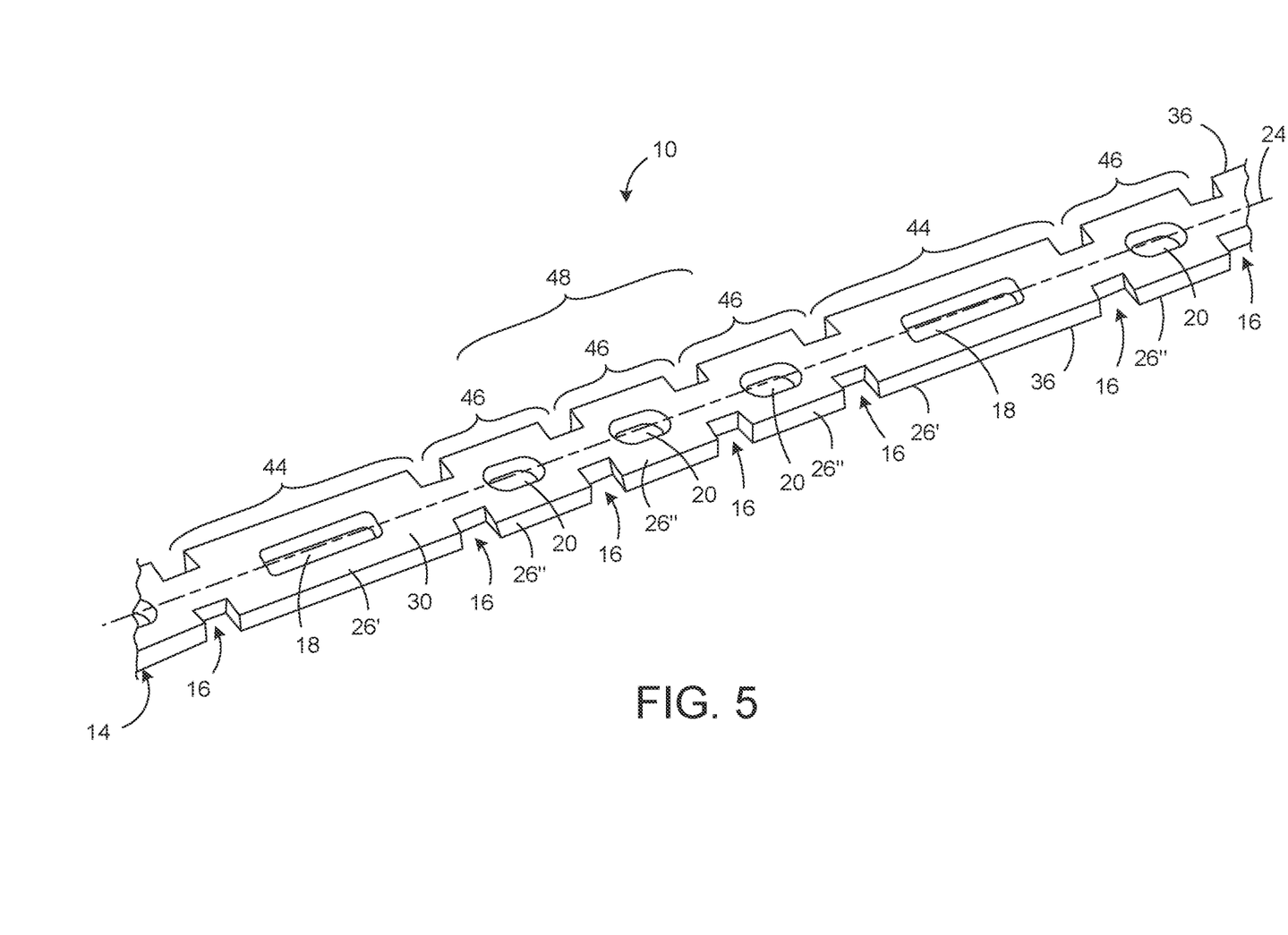
FIG. 5 is a perspective view of a portion of a cable tie according to this disclosure.
Figure 6:
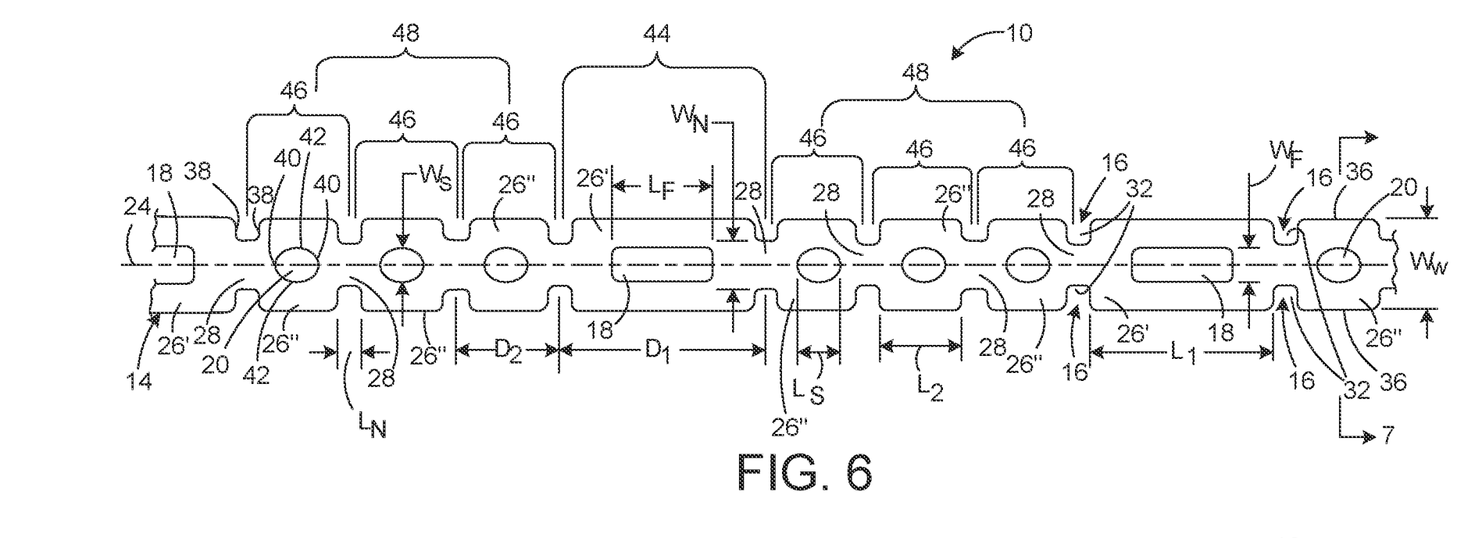
FIG. 6 is a top plan view of the cable tie shown in FIG. 5.

As best see in FIGS. 5 and 6, the strip 14 extends along a longitudinal axis 24 and includes a plurality of alternating wide portions 26 and narrow portions 28. The strip has a pair of faces 30 spaced by a thickness T transverse to the longitudinal axis 24. Each of the narrow portions 28 are defined by a pair 32 of the notches 16 that extend toward each other from longitudinally extending sides 36 of the strip 14. Each of the notches 16 have sidewalls that face each other and extend transverse to the longitudinal axis 24. Each of the wide portions 26 has a width $W_W$ transverse to the longitudinal axis 24 and each of the narrow portions 28 has a wide $W_N$ transverse to the longitudinal axis 24, with $W_N$ being less than $W_W$. In the illustrated and preferred embodiment, the longitudinally extending sides 36 are spaced from each other by the width $W_W$, and the thickness T is less than ⅕ of the width $W_W$. Each of the narrow portions 28 has a length $L_N$ parallel to the longitudinal axis 24. A first set of the wide portions 26 are longer wide portions 26' with a rectangular shape and have a length $L_1$ parallel to the longitudinal axis 24. A second set of the wide portions 26 are shorter wide portions 26''' with a square shape and have a length $L_2$ parallel to the longitudinal axis 24, with $L_1$ being greater than $L_2$, and $L_2$ being greater than $L_N$. In the illustrated and preferred embodiment, the sum of $L_1$ and $L_N$ is twice the sum of $L_2$ and $L_N$. To state this relationship in terms of an equation:

$$(L_1+L_N)/(L_2+L_N)=2.0$$

Furthermore, in the illustrated and preferred embodiment, the ratio of $L_1$ to $L_2$ equals 2.33. To state this relationship in terms of an equations:

$$L_1/L_2=2.33$$

The strip 14 further includes a plurality of first size openings 18, which in the illustrated and preferred embodiment are the elongate, rectangular shaped openings or slots 18. The openings 18 are spaced from each other along the longitudinal axis 24, with each of the openings 18 being located in a corresponding one of the longer wide portions 26' and, in the preferred and illustrated embodiment, centered on the longitudinal axis 24 and centered in the corresponding longer wide portion 26'. Each opening 18 has a length $L_F$ parallel to the longitudinal axis 24, and a width $W_F$ transverse to the longitudinal axis 24. In the illustrated and preferred embodiment, the width $W_F$ is equal to the width $W_N$ of the narrow portions, but it should be understood that the widths $W_F$ and $W_N$ may vary slightly from equal due to manufacturing tolerances. While equal is preferred, in some embodiments it may be desirable for the width $W_F$ to be as much as 15 percent greater or 15 percent less than the width $W_N$.

In the illustrated and preferred embodiment, the length $L_F$ is greater than or equal to the width $W_W$ of the wide portions 26, the width $W_F$ is greater than or equal to the thickness T of the strip 14, and the length $L_N$ of each narrow portions 28 is greater than the thickness T. This allows the cable tie 10 to encircle and retain an object, such as a bundle of cable, by inserting any one of the wide portions 26 through any one of the openings 18 and engaging one of the pair of notches 32 against the faces 30 to form the retaining loop 15. To accomplish this, a user twists one of the wide portion 90 degrees about the axis 24 so that the wide portion 26 is parallel to the length $L_F$ of one of the openings 18 and inserts the wide portion 26 into the opening 18 until a narrow portion 28 is received in the opening 18. At that point, the wide portions 26 can be allowed to rotate back 90 degrees so that the narrow portion 28 is be retained in the opening 18 with the sidewalls 38 of the corresponding notches 32 overlaying/engaging the faces 30, as best seen in FIGS. 2-4 and 8. It should be appreciated that the shorter wide portions 26'' allows for a finer adjustment of the size of the loop that is created in this process, which provides for a better retainment and mounting of a one or more cables or other objects 11.

Figure 7:
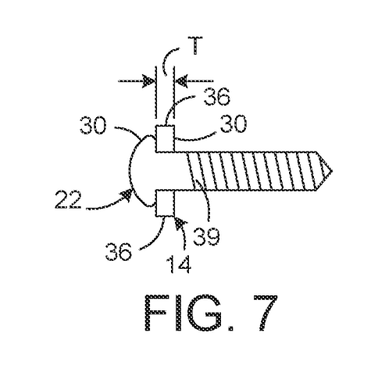
FIG. 7 is a section view taken along line 7-7 in FIG. 6, with a fastener added for purposes of illustration.
Figure 8:
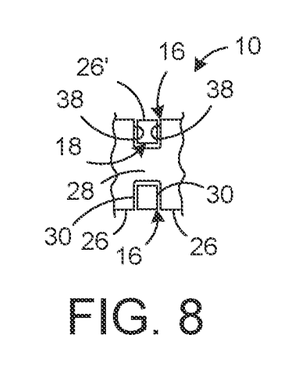
FIG. 8 is a view similar to FIG. 7, but showing a portion of the cable tie inserted through an opening in the cable tie to form a retaining loop.

Advantageously, the openings 20 are provided as a plurality of second size openings 20 that are formed in the strip 14 and spaced from each other along the longitudinal axis 24 so that one or more of the openings 20 are located between pairs of the first size openings 18. As illustrated in FIG. 7 and as previously discussed, the openings 20 are configured to allow a shank 39 of a fastener 22, such as the shank 39 of the screw 22 shown in FIG. 7, to pass through the strip 14 to mount the tie 10 to a structure. In the embodiment illustrated in FIGS. 5-8, there are three of the openings 20 located between each pair of the openings 18. Each of the openings 20 is located in a corresponding one of the shorter wide portions 26'' and, in the preferred and illustrated embodiment, is centered in the shorter wide portion 26'' and on the longitudinal axis 24. Each opening 20 has a length Ls parallel to the longitudinal axis 24, and a width $W_S$ transverse to the longitudinal axis 24. The length $L_S$ is less than the length $L_F$ of the openings 18. In the illustrated embodiment, the width $W_S$ is equal to the width $W_F$, with allowance for manufacturing tolerances. In the illustrated and preferred embodiment shown in FIGS. 5-8, each of the openings 20 has an oval shape defined be a pair of semicircular end wall portions 40 and a pair of opposed straight wall portions 42 that extend parallel to the longitudinal axis 24. The oval shape allows for minor adjustment of a fastener 22 relative to the strip 14 along the axis 24 when the shank 39 of the fastener is inserted into an opening 20.

Figure 12:
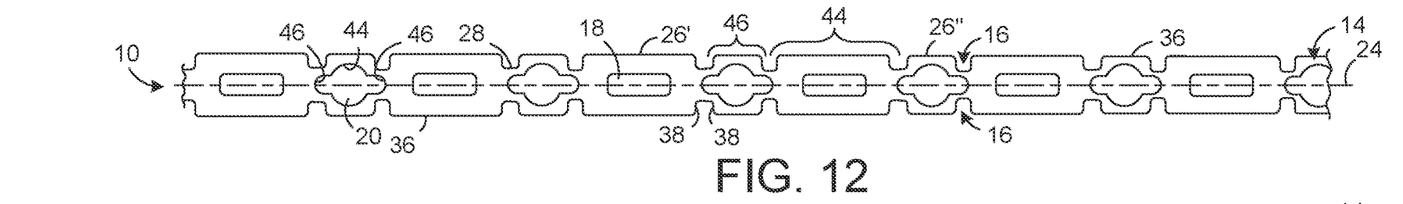
Figure 13:
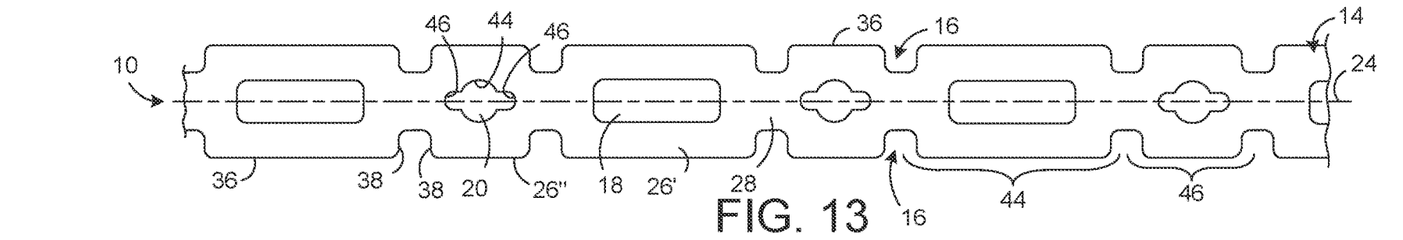

While the oval shapes of the openings 20 is preferred, other shapes may be desired. For example, each of the openings 20 can have a circular shape centered in each shorter wide portion 26" and on the axis 24 such as shown in FIGS. 2-4 and 9-11. As another example, each of the openings 20 can have a keyed shape centered in each shorter wide portion 26", such as shown in FIGS. 12 and 13, with a large semicircular center portion 44 that is sized to allow the head of a fastener 22 to pass through the opening 20 and a pair of semicircular side portions 46 that are sized to allow passage of the shank 39 of a fastener 22 while preventing the passage of the head of the fastener 22. The keyed shape of FIGS. 12 and 13 allow for a fastener 22 to first be connected to a structure 12 and then for the tie 10 to be attached to the fastener 22 by inserting the head of the fastener 22 through the center portion 44 and then to be shifted to overlay one of the side portions 46 so that the head cannot be retracted from the keyed opening 20.

Figure 9:
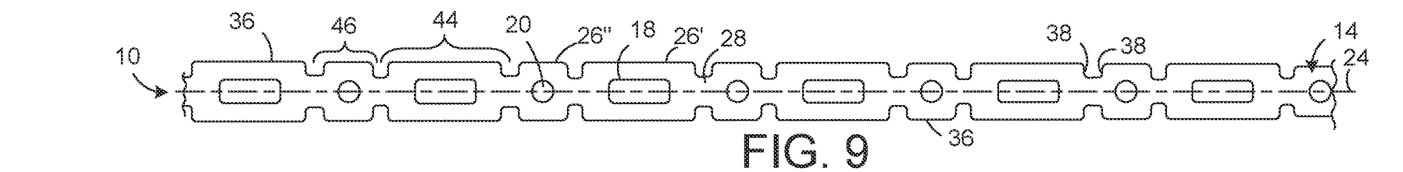
FIGS. 9-13 are top plan views of alternate embodiments of a cable ties according to this disclosure.
Figure 10:
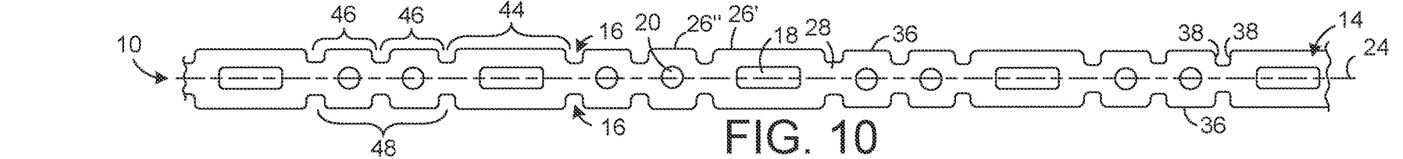
Figure 11:
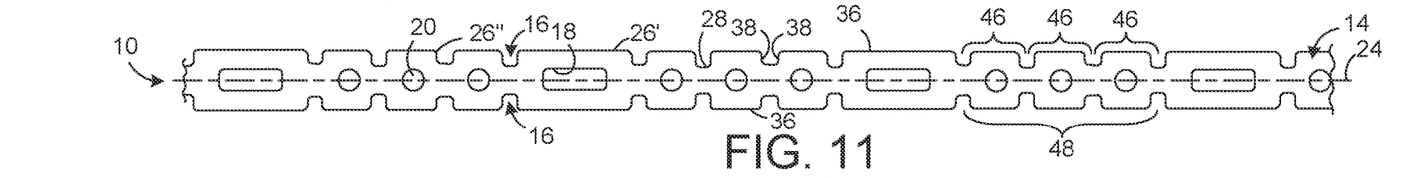

Furthermore, while it is preferred that there be three of the opening 20 and three of the shorter wide portions 26" between each pair of the openings 18 and each pair of the longer wide portions 26', in some embodiments it may be desirable to have a different number of the openings 20 and shorter wide portions 26" between each pair of the openings 18 and each pair of the longer wide portions 26'. For example, FIGS. 9, 12 and 13 show a single one of the openings 20 and a single one of the shorter wider portions 26" between each pair of the openings 18 and each pair of the longer wide portions 26', while FIG. 10 shows two of the openings 20 and two of the shorter wide portions 26" between each pair of the openings 18 and each pair of the longer wide portions 26'. As another example, it may be desirable for there to be more than one of the longer wide portions 26' and openings 18 between adjacent pairs of the openings 20 and the shorter wide portions 26".

The notches 16 are arranged as a first plurality of notch pairs 44 and a second plurality of notch pairs 46. The notch pairs 44 are spaced from each other along the strip by a first distance D1, with one of the longer wide portions 26' and one of the openings 18 located between each notch pair 44. The strip second plurality of notch pairs 46 is spaced from each other by a second distance D2, with one of the shorter wide portions 26" and one of the openings 20 located between each notch pair 46. D2 is less than D1, and in the illustrated and preferred embodiment, the ratio of $D_1/D_2$ is equal to 2. In the illustrated embodiments shown in FIGS. 5-8, 10, and 11, the notch pairs 46 are arranged in groups 48 along the strip 14, with each group 48 in FIG. 10 having two of the notch pairs 46 and each group 48 in FIGS. 5-7 and 10 having three of the notch pairs 46.

It should be appreciated that the relative spacing and sizes of the notches 16, openings 18 and 20, longer wide portions 26', and shorter wide portions 26" allow for one of the openings 20 to always overlay another one of the openings 18 or 20 when a retaining loop 15 is formed in the strip 14 to encircle one or more objects 11. This allows for the shank 39 of a fastener 22 to be easily inserted through both the one of the openings 20 and an underlying opening 18 or 20 so that the fastener 22 can be engaged with a support structure 12 to mount the tie 10 and any object or objects 11 encircled by the retaining loop 15 of the tie 10 to the structure 12, with a double layer of the strip 14 sandwiched between the head of the fastener 22 and the support structure 12 for added strength and security, as best seen in FIGS. 1-3.

It should also be understood that while a limited length of the strip 14 is shown in the Figures for purposes of illustration, the strip 14 can be of any length required for a particular application, and further that the pattern of openings 18 and 20, portions 26 and 28, and notches 16 shown in each figure can be repeated for any desired length of the strip 14.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the cable tie 10 are shown in the figures, it should be understood that this disclosure anticipates variations in the specific details of each of the disclosed components and features of the cable tie 10 and that no limitation to a specific form, configuration, or detail is intended unless expressly and specifically recited in an appended claim.

For example, while specific and preferred forms have been shown for the openings 18, other shapes are possible, including for example, oval shapes and trapezoidal shapes. As another example, while it is preferred that each of the longer portions 26 have an opening 18 and each of the shorter portions 26 have an opening 20, in some embodiments it may be desirable for only some of the longer portions 26 to have an opening 18 and/or for only some of the shorter portions 26 to have an opening 20. As a further example, while it is preferred that each of the openings 20 have the same shape and size as the other openings 20, in some embodiments it may be desirable for one or more of the openings 20 to have a different shape and/or size than others of the openings 20. Similarly, while it is preferred that each of the openings 18 have the same shape and size as the other openings 18, in some embodiments it may be desirable for one or more of the openings 18 to have a different shape and/or size than others of the openings 18. In a similar example, while it is preferred that each of the shorter portions 26 all have the same shape and size, in some applications it may be desirable for one or more of the shorter portions 26 to have a different shape and/or size than others of the shorter portions 26. Similarly, while it is preferred that each of the longer portions 26 all have the same shape and size, in some applications it may be desirable for one or more of the longer portions 26 to have a different shape and/or size than others of the longer portions 26. As another example, while it is preferred that each of the narrow portions 28 have the same width $W_N$ and the same length $L_N$, in some applications it may be desirable for one or more of the narrow portions 28 to have a different width $W_{N1}$ and/or length $L_{N1}$ than others of the narrow portions 28. As yet another example, while it is preferred for the openings 20 and 44 to be centered on the longitudinal axis and centered in the corresponding wide portion 26, in some applications it may be desirable for some or all of the openings 20 and/or the openings 18 to not be centered on the longitudinal axis and/or not centered in the corresponding wide portion 26. Similarly, while it is preferred that each of the wide portions 26 and narrow portions 28 be centered on the longitudinal axis, in some applications it may be desirable for some of the wide portions 26 and/or for some or all of the narrow portions to not be centered on the longitudinal axis 26. As yet another example, while it is preferred that the strip 16 include the openings 20, in some embodiments it may be desirable for the strip 16 to forego the openings 20 while retaining the shorter wide portions 26.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

The following are examples of subject matter that could be claimed in a non-provisional patent application claiming priority to this disclosure. It should be understood that these examples are not exhaustive and should not be considered as limiting in any way the subject matter that can be claimed in a non-provisional patent application claiming priority to this disclosure. Example claims:

1. A cable tie for attaching one or more cables to a structural member; the cable tie comprising:
   a strip of material extending along a longitudinal axis, the strip comprising:
      a plurality of alternating wide portions and narrow portions, each of the wide portions having a width $W_W$ transverse to the longitudinal axis, each of the narrow portions having a width $W_N$ transverse to the longitudinal axis, with $W_N$ being less than $W_W$; each of the narrow portions having a length $L_N$ parallel to the longitudinal axis, a first set of the wide portions having a length $L_1$ parallel to the longitudinal axis, a second set of the wide portions having a length $L_2$ parallel to the longitudinal axis, the length $L_1$ being greater than the length $L_2$, and the length $L_2$ being greater than the length $L_N$,
      a plurality of first size openings formed in the strip and spaced from each other along the longitudinal axis, each of the first size openings having a first length $L_F$ parallel to the longitudinal axis, each of the first size openings located in a corresponding one of the first set of wide portions,
      a plurality of second size openings formed in the strip and spaced from each other along the longitudinal axis so that one or more of the second size openings are located between pairs of the first size openings, each of the second size openings located in a corresponding one of the second set of wide portions, each of the second size openings having a length $L_S$ parallel to the longitudinal axis that is less than $L_F$.

2. The cable tie of claim 1 wherein a single one of the second size openings is located between each pair of first size openings.

3. The cable tie of claim 1 wherein there are two of the second size openings located between each pair of first size openings.

4. The cable tie of claim 1 wherein there are three of the second size openings located between each pair of first size openings.

5. The cable tie of claim 1 wherein each of the first size opening have a width $W_F$ transverse to the longitudinal axis that is approximately equal to the width $W_N$ of the narrow portions.

6. The cable tie of claim 1 wherein every wide portion of the first set includes one of the first size openings, and every wide portion of the second set includes one of the second size openings.

7. The cable tie of claim 1 wherein $L_F$ is equal to or greater than $W_W$.

8. The cable tie of claim 1 wherein the strip has a thickness T transverse to the longitudinal axis, and each of the first size opening have a width $W_F$ transverse to the thickness and the longitudinal axis, with $W_F$ being greater than the thickness T.

8. The cable tie of claim 1 wherein each of the first openings is centered in the corresponding one of the first set of wide portions.

9. The cable tie of claim 1 wherein each of the second openings is centered in the corresponding one of the second set of wide portions.

10. The cable tie of claim 1 wherein each of the first openings has a rectangular shape.

11. The cable tie of claim 1 wherein each of the second openings has an oval shape.

12. The cable tie of claim 1 wherein at least some of the second openings has a circular shape.

13. The cable tie of claim 1 wherein the ratio $L_1/L_2$ equals 2.33

14. The cable tie of claim 1 wherein the ratio $(L_1+L_N)/(L_2+L_1)$ equals 2.

15. The cable tie of claim 1 wherein the strip of material is a strip of elastomeric material.

16. The cable tie of claim 1 wherein each of the narrow portions is centered on the longitudinal axis.

17. The cable tie of claim 1 wherein each of the narrow portions is defined by a pair of notches formed in the strip of material.

18. The cable tie of claim 1 wherein the strip of material has a thickness transverse to the longitudinal axis that is less than ⅕ of $W_W$.

19. A cable tie for attaching one or more cables to a structural member; the cable tie comprising:
a strip of material having a pair of longitudinally extending sides spaced from each other by a width W, the strip including:
a plurality of notch pairs spaced from each other along the strip, each notch of each pair extending from one of the spaced sides toward the other notch of the pair, a first plurality of the notch pairs spaced from each other by a first distance $D_1$ and a second plurality of the notch pairs spaced from each other by a second distance $D_2$ that is less than the distance $D_1$;
a plurality of elongate openings, each opening located in the strip between two adjacent notch pairs that are spaced by the first distance $D_1$.

20. The cable tie of claim 19 wherein the ratio of $D_1/D_2$ is equal to 2.

21. The cable tie of claim 19 wherein the notch pairs of the second plurality are arranged in groups along the strip, with each group having at least two of the notch pairs located adjacent each other.

22. The cable tie of claim 19 wherein each of the elongate openings is rectangular shaped.

23. The cable tie of claim 19 wherein the strip further comprises a plurality of additional openings, each of the additional openings located in the strip between two adjacent notch pairs that are spaced by the second distance $D_2$.

24. The cable tie of claim 23 wherein each of the additional openings are oval shaped.

25. The cable tie of claim 19 wherein the strip of material is a strip of elastomeric material.

What is claimed is:

1. A cable tie for attaching one or more cables to a structural member; the cable tie comprising:
a strip of material extending along a longitudinal axis, the strip comprising:
a plurality of alternating wide portions and narrow portions, each of the wide portions having a width $W_W$ transverse to the longitudinal axis, each of the narrow portions having a width $W_N$ transverse to the longitudinal axis, with $W_N$ being less than $W_W$; each of the narrow portions having a length $L_N$ parallel to the longitudinal axis, a first set of the wide portions having a length $L_1$ parallel to the longitudinal axis, a second set of the wide portions having a length $L_2$ parallel to the longitudinal axis, the length $L_1$ being greater than the length $L_2$, and the length $L_2$ being greater than the length $L_N$,
a plurality of first size openings formed in the strip and spaced from each other along the longitudinal axis, each of the first size openings having a first length $L_F$ parallel to the longitudinal axis, each of the first size openings located in a corresponding one of the first set of wide portions, and
a plurality of second size openings formed in the strip and spaced from each other along the longitudinal axis so that one or more of the second size openings are located between pairs of the first size openings, each of the second size openings located in a corresponding one of the second set of wide portions, each of the second size openings having a length $L_S$ parallel to the longitudinal axis that is less than $L_F$, wherein $L_F$ is equal to or greater than $W_W$.

2. The cable tie of claim 1 wherein each of the first size openings have a width $W_F$ transverse to the longitudinal axis that is approximately equal to the width $W_N$ of the narrow portions.

3. The cable tie of claim 1 wherein every wide portion of the first set includes one of the first size openings, and every wide portion of the second set includes one of the second size openings.

4. The cable tie of claim 1 wherein the strip has a thickness T transverse to the longitudinal axis, and each of the first size openings have a width $W_F$ transverse to the thickness and the longitudinal axis, with $W_F$ being greater than the thickness T.

5. The cable tie of claim 1 wherein each of the second openings is centered in the corresponding one of the second set of wide portions.

6. The cable tie of claim 1 wherein each of the first size openings has a rectangular shape.

7. The cable tie of claim 1 wherein at least some of the second openings has a circular shape.

8. The cable tie of claim 1 wherein the strip of material is a strip of elastomeric material.

9. The cable tie of claim 1 wherein each of the narrow portions is centered on the longitudinal axis.

10. The cable tie of claim 1 wherein each of the narrow portions is defined by a pair of notches formed in the strip of material.

11. The cable tie of claim 1 wherein each of the first size openings is centered in the corresponding one of the first set of wide portions.

12. A cable tie for attaching one or more cables to a structural member; the cable tie comprising:
a strip of material extending along a longitudinal axis, the strip comprising:
a plurality of alternating wide portions and narrow portions, each of the wide portions having a width $W_W$ transverse to the longitudinal axis, each of the narrow portions having a width $W_N$ transverse to the longitudinal axis, with $W_N$ being less than $W_W$; each of the narrow portions having a length $L_N$ parallel to the longitudinal axis, a first set of the wide portions having a length $L_1$ parallel to the longitudinal axis, a second set of the wide portions having a length $L_2$ parallel to the longitudinal axis, the length Li being greater than the length $L_2$, and the length $L_2$ being greater than the length $L_N$,
a plurality of first size openings formed in the strip and spaced from each other along the longitudinal axis, each of the first size openings having a first length $L_F$ parallel to the longitudinal axis, each of the first size openings located in a corresponding one of the first set of wide portions, and
a plurality of second size openings formed in the strip and spaced from each other along the longitudinal axis so that one or more of the second size openings are located between pairs of the first size openings, each of the second size openings located in a corresponding one of the second set of wide portions, each of the second size openings having a length Ls parallel to the longitudinal axis that is less than $L_F$;
wherein a single one of the second size openings is located between each pair of the first size openings.

13. A cable tie for attaching one or more cables to a structural member; the cable tie comprising:
a strip of material extending along a longitudinal axis, the strip comprising:
a plurality of alternating wide portions and narrow portions, each of the wide portions having a width $W_W$ transverse to the longitudinal axis, each of the narrow portions having a width $W_N$ transverse to the longitudinal axis, with $W_N$ being less than $W_W$; each of the narrow portions having a length $L_N$ parallel to the longitudinal axis, a first set of the wide portions having a length $L_1$ parallel to the longitudinal axis, a second set of the wide portions having a length $L_2$ parallel to the longitudinal axis, the length $L_1$ being greater than the length $L_2$, and the length $L_2$ being greater than the length $L_N$ a plurality of first size openings formed in the strip and spaced from each other along the longitudinal axis, each of the first size openings having a first length $L_F$ parallel to the longitudinal axis, each of the first size openings located in a corresponding one of the first set of wide portions, and a plurality of second size openings formed in the strip and spaced from each other along the longitudinal axis so that one or more of the second size openings are located between pairs of the first size openings, each of the second size openings located in a corresponding one of the second set of wide portions, each of the second size openings having a length Ls parallel to the longitudinal axis that is less than $L_F$;

wherein there are two of the second size openings located between each pair of first size openings.

14. The cable tie of claim 13 wherein there are three of the second size openings located between each pair of first size openings.

15. A cable tie for attaching one or more cables to a structural member; the cable tie comprising:

a strip of material extending along a longitudinal axis, the strip comprising:

a plurality of alternating wide portions and narrow portions, each of the wide portions having a width $W_W$ transverse to the longitudinal axis, each of the narrow portions having a width $W_N$ transverse to the longitudinal axis, with $W_N$ being less than $W_W$; each of the narrow portions having a length $L_N$ parallel to the longitudinal axis, a first set of the wide portions having a length $L_1$ parallel to the longitudinal axis, a second set of the wide portions having a length $L_2$ parallel to the longitudinal axis, the length $L_1$ being greater than the length $L_2$, and the length $L_2$ being greater than the length $L_N$, a plurality of first size openings formed in the strip and spaced from each other along the longitudinal axis, each of the first size openings having a first length $L_F$ parallel to the longitudinal axis, each of the first size openings located in a corresponding one of the first set of wide portions, and a plurality of second size openings formed in the strip and spaced from each other along the longitudinal axis so that one or more of the second size openings are located between pairs of the first size openings, each of the second size openings located in a corresponding one of the second set of wide portions, each of the second size openings having a length $L_S$ parallel to the longitudinal axis that is less than $L_F$ wherein each of the second size openings has an oval shape.

16. A cable tie for attaching one or more cables to a structural member; the cable tie comprising:

a strip of material extending along a longitudinal axis, the strip comprising:

a plurality of alternating wide portions and narrow portions, each of the wide portions having a width $W_W$ transverse to the longitudinal axis, each of the narrow portions having a width $W_N$ transverse to the longitudinal axis, with $W_N$ being less than $W_W$; each of the narrow portions having a length $L_N$ parallel to the longitudinal axis, a first set of the wide portions having a length $L_1$ parallel to the longitudinal axis, a second set of the wide portions having a length $L_2$ parallel to the longitudinal axis, the length $L_1$ being greater than the length $L_2$, and the length $L_2$ being greater than the length $L_N$ a plurality of first size openings formed in the strip and spaced from each other along the longitudinal axis, each of the first size openings having a first length $L_F$ parallel to the longitudinal axis, each of the first size openings located in a corresponding one of the first set of wide portions, and a plurality of second size openings formed in the strip and spaced from each other along the longitudinal axis so that one or more of the second size openings are located between pairs of the first size openings, each of the second size openings located in a corresponding one of the second set of wide portions, each of the second size openings having a length $L_S$ parallel to the longitudinal axis that is less than $L_F$;

wherein the ratio $L_1/L_2$ equals 2.33.

17. A cable tie for attaching one or more cables to a structural member; the cable tie comprising:

a strip of material extending along a longitudinal axis, the strip comprising:

a plurality of alternating wide portions and narrow portions, each of the wide portions having a width $W_W$ transverse to the longitudinal axis, each of the narrow portions having a width $W_N$ transverse to the longitudinal axis, with $W_N$ being less than $W_W$; each of the narrow portions having a length $L_N$ parallel to the longitudinal axis, a first set of the wide portions having a length $L_1$ parallel to the longitudinal axis, a second set of the wide portions having a length $L_2$ parallel to the longitudinal axis, the length $L_1$ being greater than the length $L_2$, and the length $L_2$ being greater than the length $L_N$, a plurality of first size openings formed in the strip and spaced from each other along the longitudinal axis, each of the first size openings having a first length $L_F$ parallel to the longitudinal axis, each of the first size openings located in a corresponding one of the first set of wide portions, and a plurality of second size openings formed in the strip and spaced from each other along the longitudinal axis so that one or more of the second size openings are located between pairs of the first size openings, each of the second size openings located in a corresponding one of the second set of wide portions, each of the second size openings having a length Ls parallel to the longitudinal axis that is less than $L_F$;

wherein the ratio $(L_1+L_N)/(L_2+L_1)$ equals 2.

18. A cable tie for attaching one or more cables to a structural member; the cable tie comprising:

a strip of material extending along a longitudinal axis, the strip comprising:

a plurality of alternating wide portions and narrow portions, each of the wide portions having a width $W_W$ transverse to the longitudinal axis, each of the narrow portions having a width $W_N$ transverse to the longitudinal axis, with $W_N$ being less than $W_W$; each of the narrow portions having a length $L_N$ parallel to the longitudinal axis, a first set of the wide portions having a length $L_1$ parallel to the longitudinal axis, a second set of the wide portions having a length $L_2$ parallel to the longitudinal axis, the length $L_1$ being greater than the length $L_2$, and the length $L_2$ being greater than the length $L_N$, a plurality of first size openings formed in the strip and spaced from each other along the longitudinal axis, each of the first size openings having a first length $L_F$ parallel to the longitudinal axis, each of the first size openings located in a corresponding one of the first set of wide portions, and a plurality of second size openings formed in the strip and spaced from each other along the longitudinal axis so that one or more of the second size openings are located between pairs of the first size openings, each of the second size openings located in a corresponding one of the second set of wide portions, each of the second size openings having a length Ls parallel to the longitudinal axis that is less than $L_F$;

wherein the strip of material has a thickness transverse to the longitudinal axis that is less than ⅕ of $W_W$.

19. A cable tie for attaching one or more cables to a structural member; the cable tie comprising:

a strip of material having a pair of longitudinally extending sides spaced from each other by a width W, the strip including:

a plurality of notch pairs spaced from each other along the strip, each notch of each pair extending from one of the spaced sides toward the other notch of the pair, a first plurality of the notch pairs spaced from each other by a first distance $D_1$ and a second plurality of the notch pairs spaced from each other by a second distance $D_2$ that is less than the distance $D_1$; and a plurality of elongate openings, each opening located in the strip between two adjacent notch pairs that are spaced by the first distance $D_1$; wherein the ratio of $D_1/D_2$ is equal to 2.

20. The cable tie of claim 19 wherein the notch pairs of the second plurality are arranged in groups along the strip, with each group having at least two of the notch pairs located adjacent each other.

21. The cable tie of claim 19 wherein each of the elongate openings is rectangular shaped.

22. The cable tie of claim 19 wherein the strip of material is a strip of elastomeric material.

23. A cable tie for attaching one or more cables to a structural member; the cable tie comprising:

a strip of material having a pair of longitudinally extending sides spaced from each other by a width W, the strip including:

a plurality of notch pairs spaced from each other along the strip, each notch of each pair extending from one of the spaced sides toward the other notch of the pair, a first plurality of the notch pairs spaced from each other by a first distance $D_1$ and a second plurality of the notch pairs spaced from each other by a second distance $D_2$ that is less than the distance $D_1$; and a plurality of elongate openings, each opening located in the strip between two adjacent notch pairs that are spaced by the first distance $D_1$;

wherein the strip further comprises a plurality of additional openings, each of the additional openings located in the strip between two adjacent notch pairs that are spaced by the second distance $D_2$, and wherein each of the additional openings are oval shaped.

* * * * *